United States Patent [19]

Himmelstein et al.

[11] Patent Number: 4,616,512
[45] Date of Patent: Oct. 14, 1986

[54] TORQUEMETER

[75] Inventors: Sydney Himmelstein, Barrington Hills; Richard S. Tveter, Barrington; James P. Beck, Elgin, all of Ill.

[73] Assignee: S. Himmelstein and Company, Hoffman Estates, Ill.

[21] Appl. No.: 674,165

[22] Filed: Nov. 23, 1984

[51] Int. Cl.⁴ ............................................. G01L 3/10
[52] U.S. Cl. ............................ 73/862.36; 73/DIG. 2
[58] Field of Search .......... 73/DIG. 2, 862.33, 862.36

[56] References Cited

U.S. PATENT DOCUMENTS

| Re. 26,501 | 12/1968 | Himmelstein et al. | 336/120 |
|---|---|---|---|
| Re. 28,899 | 7/1976 | Himmelstein et al. | 173/12 |
| 3,441,886 | 4/1969 | Tveter | 336/120 |
| 3,501,950 | 3/1970 | Hohenberg | 73/862.36 |
| 3,531,748 | 9/1970 | Tveter et al. | 336/120 |
| 3,531,749 | 9/1970 | Tveter et al. | 336/120 |
| 3,717,029 | 2/1973 | Tveter | 73/862.35 |
| 3,800,591 | 4/1974 | Tveter | 73/862.35 |
| 3,827,506 | 8/1974 | Himmelstein et al. | 173/12 |
| 3,861,206 | 1/1975 | Kawafune et al. | 73/862.36 X |
| 3,961,525 | 6/1976 | Himmelstein | 73/136 A |
| 4,142,591 | 3/1979 | Himmelstein | 173/12 |
| 4,320,463 | 3/1982 | Himmelstein | 364/552 |
| 4,364,278 | 12/1982 | Horter et al. | 73/862.36 |
| 4,381,684 | 5/1983 | Himmelstein | 74/862 |
| 4,412,198 | 10/1983 | Reich | 336/120 |
| 4,506,554 | 3/1985 | Blomkvist et al. | 73/862.36 |
| 4,563,905 | 1/1986 | Himmelstein | 73/862.36 |

FOREIGN PATENT DOCUMENTS

| 0657281 | 4/1979 | U.S.S.R. | 73/862.36 |
|---|---|---|---|
| 0667836 | 6/1979 | U.S.S.R. | 73/862.36 |

Primary Examiner—Charles A. Ruehl
Attorney, Agent, or Firm—Wood, Dalton, Phillips, Mason & Rowe

[57] ABSTRACT

A nonintrusive, or noncontact, shaft torquemeter for use in measuring torque transmission through a rotatable shaft. The torquemeter includes an annular torque-sensing coil structure having an annular excitation coil and a pickup coil magnetically coupled to the excitation coil through an improved magnetostrictive coupling structure carried by the shaft. In the illustrated embodiment, the magnetostrictive coupling portion is provided on a tube coaxially fixed at its ends to the shaft. The invention comprehends the provision of structure for preventing a continuous annular conductive path through the coupling portion or tube. Other structure for improving torque measuring accuracy may be provided, including the use of an outer magnetic stator core, and the provision of annular corrugations in the tube for preventing transmission of nontorque forces, such as bending forces, to the coupling portion. In one embodiment, the coupling portion is defined by a portion of the mounting tube, and in another embodiment, the coupling portion is defined by a layer of magnetostrictive material on the tube.

32 Claims, 8 Drawing Figures

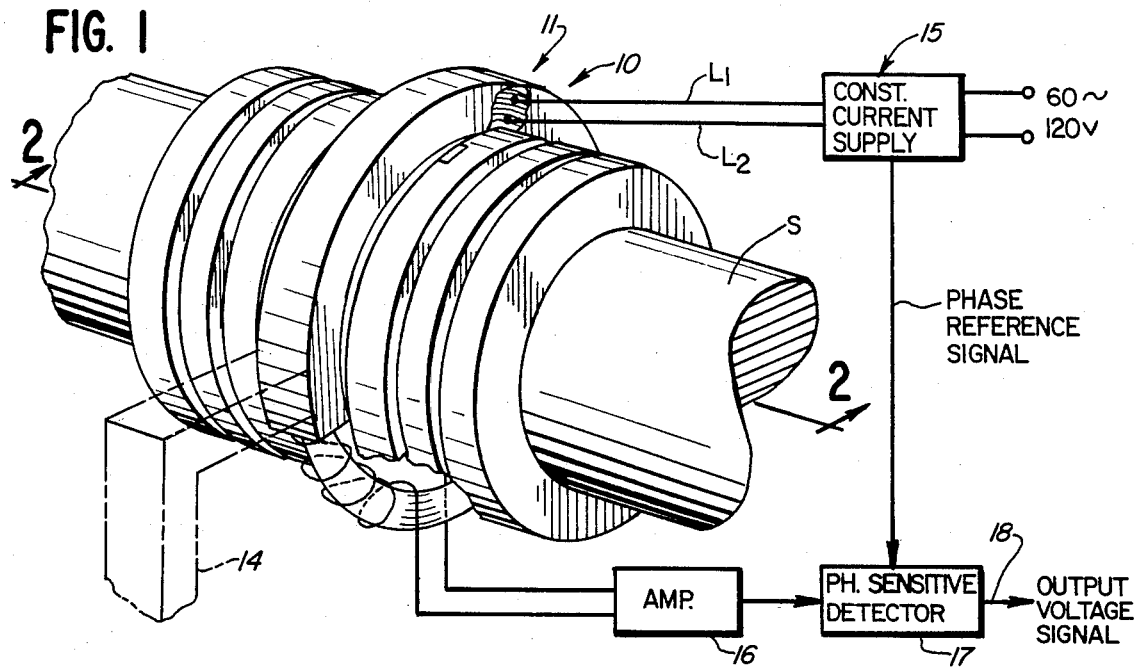
FIG. 1
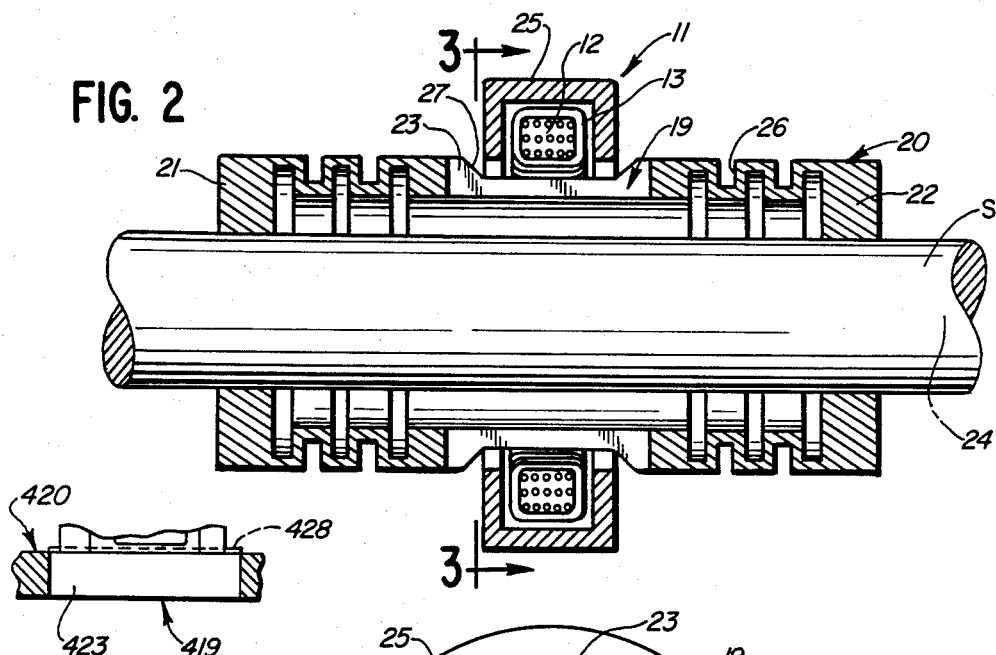
FIG. 2
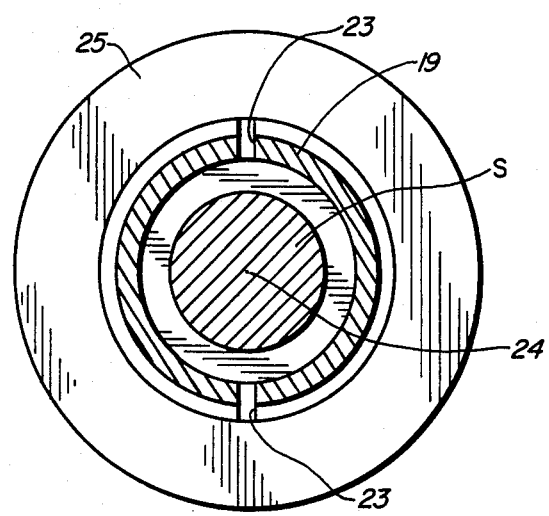
FIG. 8
FIG. 3

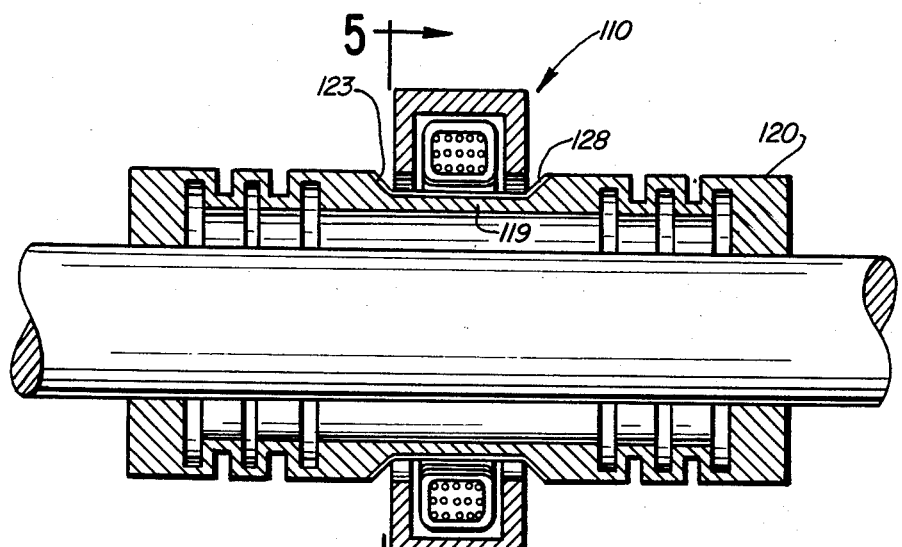
FIG. 4
FIG. 5
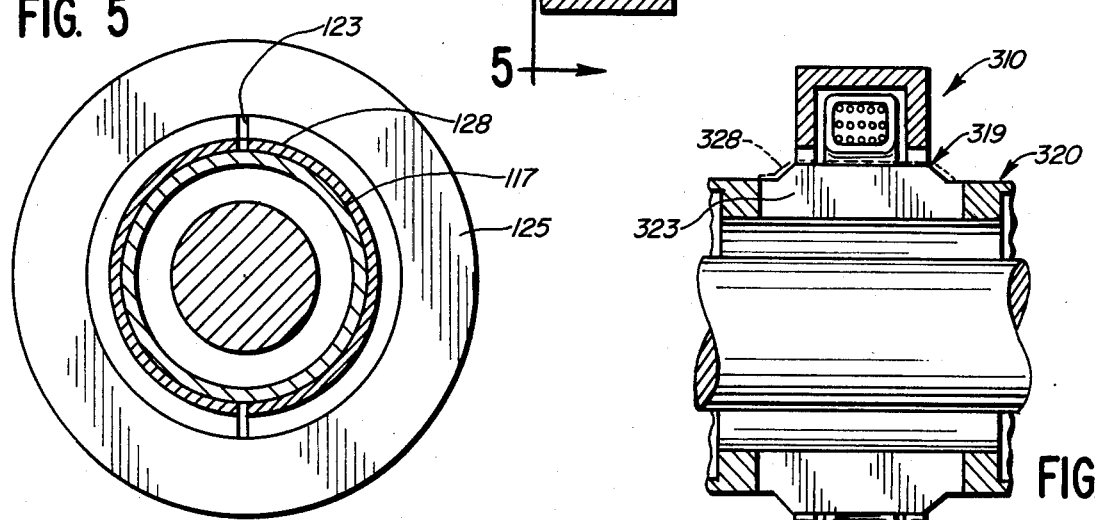
FIG. 7
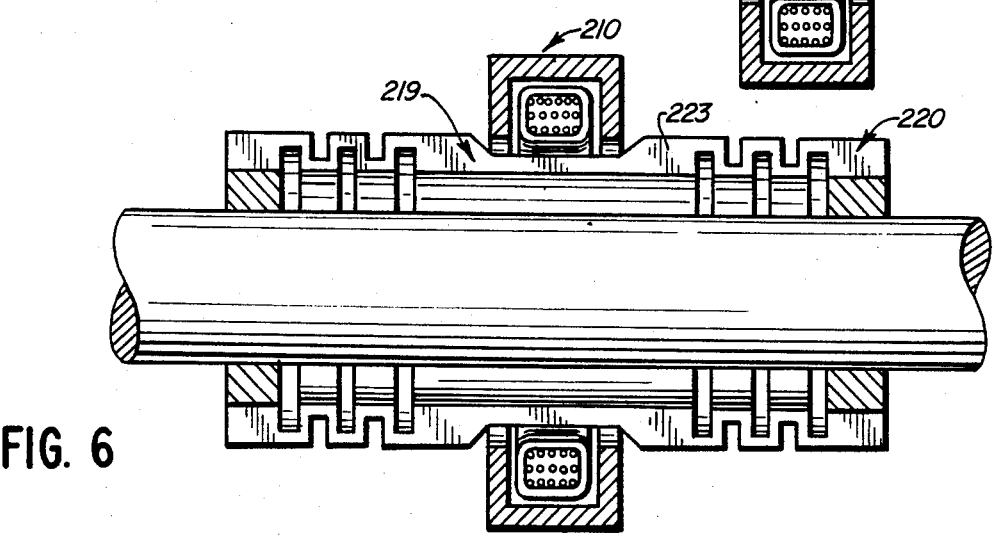
FIG. 6

TORQUEMETER

BACKGROUND OF THE INVENTION

1. Field of the Invention

This invention relates to torquemeters and in particular to noncontact shaft torquemeters.

2. Description of the Background Art

A number of different forms of torquemeters have been developed for indicating the torque being transmitted through a shaft. One conventional form of such a torquemeter utilizes a strain gage mounted to the shaft. Such torquemeters provide excellent means for indicating such torque transmission and have found widespread commercial use.

In some applications, however, it is desirable to avoid any change in the mechanical characteristics of the load-bearing shaft network. One such application is in turbo machines and the like, wherein the shaft characteristics are accurately designed to optimize the shaft dynamics for efficient operation at the conventional high speeds at which such equipment is operated.

Additionally, nonintrusive torquemeters are advantageously applied in other forms of machinery wherein it is desirable to avoid repositioning of the drive elements or affect the shaft balance, shaft overload capacity, and/or shaft stiffness.

Such nonintrusive shaft torquemeters commonly are arranged to utilize the magnetic anisotropy induced in the shaft by shear stresses resulting from the applied torque.

The presently available nonintrusive shaft torquemeters of this type have the serious disadvantage of limited measurement accuracy because of spurious signals developed for a number of reasons. Such spurious signals are generated by residual magnetic nonuniformity within the shaft, the effects of mechanical vibration of the shaft, and the effects of shaft runout and associated air gap variations. Another problem which has arisen in a number of the prior art structures is the residual variations in output resulting from variations in the shaft position defining the zero point. Such variations in the zero point positioning cause significant measurement uncertainties.

Another serious problem of the known nonintrusive shaft torquemeters is the adverse effect on accuracy caused by axial and radial shaft temperature gradients. Such temperature gradients commonly exist in shaft systems wherein power consuming and power producing devices are located at different points along the shaft.

The use of spaced windings and associated magnetic structures around the circumference of the shaft has been one attempted solution but has been found not to completely integrate out the signal variations caused by the above discussed anomalies and bending of the shaft in use.

SUMMARY OF THE INVENTION

The present invention comprehends an improved nonintrusive shaft torquemeter providing an improved magnetostrictive coupling between the excitation and pickup coils of the torque-sensing coil structure thereof.

More specifically, the invention comprehends providing means cooperating with the shaft for providing the magnetostrictive coupling.

The invention further comprehends the provision of such magnetostrictive means which is annularly discontinuous so as to prevent the continuous annular conductive path therethrough.

The invention comprehends that the magnetostrictive coupling means comprise a portion of a tube coaxially fixed to the shaft.

In another embodiment, the magnetostrictive coupling means comprises a separate element boned to the tube.

In one embodiment, the entire tube comprises magnetostrictive material.

In one embodiment, the magnetostrictive coupling portion of the tube comprises a radially thinned portion.

In one embodiment, the tube includes means for preventing transmission of shaft-bending moments and thrust forces to the magnetostrictive coupling portion.

The tube may be fixedly secured to the shaft at its opposite ends, with the magnetostrictive coupling portion disposed intermediate said ends.

In the illustrated embodiment, the means associated with the tube for preventing a continuous annular conductive path comprises gaps extending radially through an annular magnetostrictive coupling portion.

The invention further comprehends that the magnetostrictive coupling portion have a radial thickness different from the radial thickness of the remainder of the tube axially outwardly thereof.

In one form, the gap extends radially through and axially the length of the tube.

More specifically, the invention comprehends the provision in a noncontact shaft torquemeter for use in measuring torque transmission through a rotatable shaft, and wherein the torquemeter has an annular torque-sensing coil structure including an annular excitation coil arranged to be disposed coaxially of the shaft and a pickup coil associated with the excitation coil to be magnetically coupled to the excitation coil to provide an output signal varying as a function of variation in the magnetic coupling therebetween, of an improved coupling means comprising a tube coaxially fixed at its opposite ends to the shaft and defining a reduced thickness magnetostrictive coupling portion, means associated with the coupling portion for preventing a continuous annular conductive path through the coupling portion of the tube, means for mounting the coil structure coaxially about the coupling portion for coupling the excitation and pickup coils through the coupling portion, and means associated with the tube for preventing bending and thrust distortion of the shaft from affecting the magnetostrictive condition of the coupling portion.

The improved noncontact shaft torquemeter structure of the present invention is extremely simple and economical of construction, while yet providing a substantially improved, highly accurate torque measuring functioning not obtainable with the devices of the prior art.

BRIEF DESCRIPTION OF THE DRAWING

Other features and advantages of the invention will be apparent from the following description taken in connection with the accompanying drawing wherein:

FIG. 1 is a schematic perspective view illustrating the torquemeter system of the present invention;

FIG. 2 is a diametric section thereof taken substantially along the line 2—2 of FIG. 1;

FIG. 3 is a transverse section taken substantially along the line 3—3 of FIG. 2;

FIG. 4 is a diametric section of a modified form of noncontact shaft torquemeter structure embodying the invention;

FIG. 5 is a transverse section thereof taken substantially along the line 5—5 of FIG. 4;

FIG. 6 is a diametric section of another modified form of noncontact shaft torquemeter structure embodying the invention;

FIG. 7 is a fragmentary diametric section illustrating yet another modified form of noncontact shaft torquemeter structure embodying the invention; and FIG. 8 is a fragmentary diametric section illustration still another form of noncontact shaft torquemeter embodying the invention.

DESCRIPTION OF THE PREFERRED EMBODIMENTS

In the illustrative embodiments of the invention as disclosed in the drawing, a nonintrusive torquemeter generally designated 10 is shown to comprise means for measuring the torque in a shaft S. As seen in FIG. 1, the torquemeter is arranged coaxially about the shaft and is defined by an annular coil structure 11 including an excitation coil 12 and a pickup coil 13.

The coil structure 11 is supported coaxially of the shaft by any suitable support, such as support 14. The excitation coil is excited by a constant current alternating current power supply generally designated 15 through power supply leads L1 and L2. In the illustrated embodiment, constant current supply 15 is connected to a conventional 60-cycle, 120-volt alternating current power supply.

The pickup coil 13 comprises a secondary winding which is connected through an amplifier 16 to a phase sensitive detector 17. A phase reference signal is provided from the constant current supply 15 to the phase sensitive detector 17 so as to combine with the signal received from amplifier 16 and provide an output voltage signal 18 corresponding to the torque being transmitted through shaft S.

The excitation supply 15 provides an excitation signal such as in the range of 1 to 5 kHz. It is desirable to provide the signal at a suitable frequency so as to effect magnetic saturation of a magnetostrictive coupling portion 19 of a tube generally designated 20 coaxially fixed to shaft S at its opposite ends 21 and 22.

The invention comprehends that means be provided in association with the coupling portion for preventing a continuous annular conductive path through the coupling portion. As seen in FIGS. 2 and 3, such means are comprised of one or more gaps 23 extending axially through coupling portion 19. As seen in FIG. 3, a plurality of such gaps may be provided at equiangularly spaced positions about the axis 24 of shaft S. By providing such discontinuity in the annular configuration of the magnetostrictive portion 19, shorting of the portin 19 is effectively prevented, thereby providing improved accuracy in the torque measuring operation.

More specifically, coupling between the excitation coil 12 and pickup coil 13 is effected through the magnetostrictive coupling portion 19. The magnetostrictive coupling portion may be formed of a material having optimized magnetostrictive properties, thus permitting use of a torquemeter 10 with shafts having other than optimized magnetostrictive properties.

The tube ends 21 and 22 are fixedly secured to the shaft S by any suitable means, such as being clamped thereto, being heat shrunk thereabout, being bonded thereto by suitable bonding means, etc. As the tube is clamped to the shaft at each of its ends, it will twist from end to end exactly the same amount as the shaft portion radially inwardly thereof. The tube will carry a portion of the load being transmitted through the shaft. The division of the torque generated in the shaft and the tube is a function of geometry and is readily determined for correlation with the output voltage signal 18 in providing the desired shaft torque measurement.

To assist in the desired saturation of the magnetic field in the magnetostrictive portion 19, a split annular core structure 25 is arranged coaxially about the coil structure 11, as best seen in FIG. 2. The core structure further shields the coil structure 11 from ambient magnetic fields, further improving the accuracy of the torque measurement.

Torquemeter 10 utilizes a tube 20 which is formed of suitable magnetostrictive material providing optimized coupling of the excitation and pickup coils in obtaining an accurate measurement of the torque being transmitted through shaft S.

Alternatively, the tube 20 may be formed of a nonmagnetic material, such as aluminum or brass, and radially outwardly plated with a magnetostrictive material, such as nickel.

Further, as shown in FIG. 2, the tube may be provided with suitable annular slots 26 adjacent its ends 21 and 22 defining means for isolating the coupling portion 19 from extraneous nontorsion loads developed in the shaft S, such as bending and thrust loads applied thereto. Such isolation provides further improved accuracy in the torque measurement.

As further shown in FIG. 2, the coupling portion 19 may define a radially thinned portion so as to concentrate the magnetostriction effect adjacent the coil structure 11. Illustratively, as seen in FIG. 2, the thinning may be effected by providing a radially outwardly opening annular groove 27 underlying the coil structure 11.

Referring to the embodiment of FIGS. 4 and 5, a modified form of torquemeter generally designated 110 embodying the invention is shown to comprise a torquemeter generally similar to torquemeter 10 but wherein the magnetostrictive portion of the tube 120 comprises a radially outer layer of magnetostrictive material generally designated 128 on coupling portion 119. The gaps 123 extend radially only through the layer 128. The remainder of tube 120 is preferably formed of a nonmetallic material so that shorting of the magnetostrictive coupling is effectively prevented. Resultingly, the stress profile is at a high and relatively uniform value about the tube, other than at the gapped area of the magnetostrictive layer. Thus, the torquemeter 110 provides further improved accuracy in the torque measurement.

The layer 128 may comprise segments bonded to the tube 120, material coated to the outer surface thereof, etc. The securing of the layer 128 to the tube may be effected by any suitable means, such as adhesive bonding, etc.

Thus, the invention comprehends an improved nonintrusive torquemeter structure wherein high accuracy in the torque measurement is obained by utilizing a magnetostrictive coupling portion for the nonintrusive coil structure other than the outer surface of the shaft in which the torque is being measured. The invention comprehends providing a separate tubular means mounted to the shaft which may have optimized magnetostrictive properties for providing improved sensing of the torque transmission through the shaft. The invention further comprehends providing means for preventing shorting of the annular magnetostrictive coupling portion so as to provide further improved accuracy.

The torquemeter may further include an annular magnetic stator core structure, optional intercutting of the tube at the magnetostrictive coupling portion, and/or means for preventing nontorque stresses from being transmitted from the shaft to the coupling portion, as desired.

The entire tube may be formed of magnetostrictive material. Alternatively, the magnetostrictive material may be provided only at the coupling portion. Means are provided for preventing an annularly shorted configuration of the coupling portion.

As shown in FIG. 6, still another form of nonintrusive torquemeter structure generally designated 210 is shown to comprise a torquemeter structure generally similar to torquemeter structure 10, but wherein the gap 223 extends the full length of the tube 220. Thus, short circuit currents are prevented from being developed in any portion of the tube, including portions laterally of the magnetostrictive portion 219.

As seen in FIG. 7, the magnetostrictive portion 319 of the torquemeter structure may have a radial thickness greater than the radial thickness of the tube 320 laterally of the portion 319 aligned with the coil structure. As shown in FIG. 8, the magnetostrictive portion 419 associated with the coil structure may alternatively have the same thickness as the remainder of the tube 420. As will be obvious to those skilled in the art, the radial thickness of the coupling portion may be selected so as to cause the stresses therein to be adjusted for optimum magnetostrictive coupling characteristics. As will be further obvious to those skilled in the art, the embodiments of FIGS. 7 and 8 may be formed in correspondence with the structural concept of FIG. 2, wherein the entire tube is formed of magnetostrictive material, or in conformity with the embodiment of FIG. 4 wherein only the surface of the tube at the coupling portion is formed of magnetostrictive material. This is illustrated in dotted lines in FIGS. 7 and 8 in the alternative utilizataion of a magnetostrictive layer 328 on the portion 319 in FIG. 7, and layer 428 on the coupling portion 419 in FIG. 8. As shown in FIGS. 7 and 8, the gaps 323 and 423, respectively, may extend only at the coupling portion, as in the embodiment of FIG. 2. Alternatively, the gaps may extend the length of the tube, as in the embodiment of FIG. 6, within the scope of the invention.

The foregoing disclosure of specific embodiments is illustrative of the broad inventive concepts comprehended by the invention.

We claim:

1. In a noncontact shaft torquemeter for use in measuring torque transmission through a rotatable shaft, said torquemeter having an annular torque-sensing coil structure including an annular excitation coil arranged to be disposed coaxially of the shaft and a pickup coil associated with the excitation coil to be magnetically coupled to the excitation coil to provide an output signal varying as a function of variation in the magnetic coupling therebetween, the improvement comprising:
    a tube coaxially fixed to the shaft and defining a magnetostrictive coupling portion;
    means associated with said coupling portion and having an axial extent substantially greater than the axial extent of said coil structure for preventing as continuous annular conductive path through substantially the entirety of said coupling portion of the tube in all angular portions of the shaft without introducing a torque reading discontinuity; and
    means for mounting said coil structure coaxially about said coupling portion for coupling said excitation and pickup coil through said coupling portion.

2. The noncontact shaft torquemeter of claim 1 wherein said means associated with said coupling portion of the tube comprises a gap extending radially through said coupling portion.

3. The noncontact shaft torquemeter of claim 1 wherein said means associated with said coupling portion of the tube comprises a plurality of angularly spaced gaps extending radially through said coupling portion.

4. The noncontact shaft torquemeter of claim 1 wherein said means associated with said coupling portion of the tube comprises a plurality of equiangularly spaced gaps extending radially through said coupling portion.

5. The noncontact shaft torquemeter of claim 1 wherein said means associated with said coupling portion of the tube comprises a gap extending fully radially through said coupling portion.

6. The noncontact shaft torquemeter of claim 1 wherein the entire tube is formed of magnetostrictive material.

7. The noncontact shaft torquemeter of claim 1 wherein said magnetostrictive coupling portion comprises a thin body of magnetostrictive material coaxially on said tube.

8. In a noncontact shaft torquemeter for use in measuring torque transmission through a rotatable shaft, said torquemeter having an annular torque-sensing coil structure including an annular excitation coil arranged to be disposed coaxially of the shaft and a pickup coil associated with the excitation coil to be magnetically coupled to the excitation coil to provide an output signal varying as a function of variation in the magnetic coupling therebetween, the improvement comprising:
    a tube coaxially fixed to the shaft and defining a magnetostrictive coupling portion;
    means associated with said coupling portion for preventing a continuous annular conductive path through said coupling portion of the tube in all angular positions of the shaft without introducing a torque reading discontinuity; and
    means for mounting said coil structure coaxially about said coupling portion for coupling said excitation and pickup coil through said coupling portion, said tube defining an annular portion having reduced radial thickness and said means associated with said coupling portion of the tube comprising an axial gap through said reduced thickness annular portion.

9. The noncontact shaft torquemeter of claim 8 wherein said axial gap further extends through a portion of the tube adjacent to said reduced thickness annular portion.

10. In a noncontact shaft torquemeter for use in measuring torque transmission through a rotatable shaft, said torquemeter having an annular torque-sensing coil structure including an annular excitation coil arranged to be disposed coaxially of the shaft and a pickup coil associated with the excitation coil to be magnetically coupled to the excitation coil to provide an output signal varying as a function of variation in the magnetic coupling therebetween, the improvement comprising:
  a tube coaxially fixed to the shaft and defining a magnetostrictive coupling portion;
  means associated with said coupling portion for preventing a continuous annular conductive path through said coupling portion of the tube in all angular positions of the shaft without introducing a torque reading discontinuity; and
  means for mounting said coil structure coaxially about said coupling portion for coupling said excitation and pickup coil through said coupling portion, said tube including means for peventing transmission of nontorque forces to said coupling portion.

11. In a noncontact shaft torquemeter for use in measuring torque transmission through a rotatable shaft, said torquemeter having an annular torque-sensing coil structure including an annular excitation coil arranged to be disposed coaxially of the shaft and a pickup coil associated with the excitation coil to be magnetically coupled to the excitation coil to provide an output signal varying as a function of variation in the magnetic coupling therebetween, the improvement comprising:
  an annular electrically conductive means arranged to be coaxially of the shaft and having axially spaced portions and defining a magnetostrictive coupling portion therebetween;
  means for mounting said spaced portions fixedly to the shaft;
  means associated with said coupling portion and having an axial extent substantially greater than the axial extent of said coil structure for preventing a continuous annular conductive path through said coupling portion in all angular positions of the shaft without introducing a torque reading discontinuity comprising a gap extending radially through and axially the length of said annular electrically conductive means; and
  means for mounting said coil structure coaxially about said coupling portion for coupling said excitation and pickup coil through said coupling portion.

12. The noncontact shaft torquemeter of claim 11 wherein said magnetostrictive coupling portion has a radial thickness different from the radial thickness of the annular electrically conductive means axially outwardly thereof.

13. The noncontact shaft torquemeter of claim 11 wherein said magnetostrictive coupling portion has a radial thickness greater than the radial thickness of the annular electrically conductive means axially outwardly thereof.

14. The noncontact shaft torquemeter of claim 11 wherein said magnetostrictive coupling portion has a radial thickness less than the radial thickness of the annular electrically conductive means axially outwardly thereof.

15. The noncontact shaft torquemeter of claim 11 wherein said axially spaced portions comprise opposite end portions of the annular electrically conductive means.

16. In a noncontact shaft torquemeter for use in measuring torque transmission through a rotatable shaft, said torquemeter having an annular torque-sensing coil structure including an annular excitation coil arranged to be disposed coaxially of the shaft and a pickup coil associated with the excitation coil to be magnetically coupled to the excitation coil to provide an output signal varying as a function of variation in the magnetic coupling therebetween, the improvement comprising:
  a tube coaxially fixed to the shaft and defining a magnetostrictive coupling portion;
  means associated with said coupling portion for preventing a continuous annular conductive path through said coupling portion of the tube; and
  means for mounting said coil structure coaxially about said coupling portion for coupling said excitation and pickup coil through said coupling portion, said magnetostrictive coupling portion having a radial thickness different from the radial thickness of the tube axially thereof and is provided with a gap extending radially through and axially the length of said coupling portion.

17. The noncontact shaft torquemeter of claim 16 wherein said gap extends axially the length of said tube.

18. A noncontact shaft torquemeter for use in measuring torque transmission through a rotatable shaft, comprising:
  an annular torque-sensing coil structure including an annular excitation coil arranged to be disposed coaxially of the shaft and a pickup coil wound transversely about the excitation coil coaxially of the annular axis of the excitation coil to be in space quadrature therewith so as to be magnetically coupled to the excitation coil to provide an output signal varying as a function of variation in the magnetic coupling therebetween;
  an annular magnetostrictive wall element;
  means for carrying the axially opposite ends of said wall element coaxially to the shaft;
  means for mounting said coil structure coaxially about said wall element at a preselected portion thereof to include said portion in the magnetic coupling path between said coils, said excitation coil providing a magnetic field in said wall element; and
  means for causing saturation of the magnetic field in said wall element comprising a split core structure extending about said coil structure to adjacent said wall element.

19. The noncontact shaft torquemeter of claim 18 wherein said wall element comprises a tin body of magnetostrictive material on a carrier supported on said shaft.

20. The noncontact shaft torquemeter of claim 18 wherein said wall element comprises a thin body of magnetostrictive material on a nonmagnetic carrier supported on said shaft.

21. The noncontact shaft torquemeter of claim 18 wherein said wall element comprises a thin body of magnetostrictive material on a nonmagnetic annular carrier supported coaxially on said shaft.

22. The noncontact shaft torquemeter of claim 18 wherein said wall element comprises a thin body of magnetostrictive material on a nonmagnetic annular carrier supported at its opposite ends coaxially on said shaft.

23. The noncontact shaft torquemeter of claim 18 wherein said wall element comprises a thin body of magnetostrictive material on a nonmagnetic annular carrier clamped at its opposite ends coaxially on said shaft.

24. The noncontact shaft torquemeter of claim 18 wherein said wall element comprises a thin body of magnetostrictive material on a nonmagnetic annular carrier heat shrunk at its opposite ends coaxially on said shaft.

25. The noncontact shaft torquemeter of claim 18 wherein said wall element comprises a layer of magnetostrictive material deposited on a nonmagnetic carrier supported on said shaft.

26. In a noncontact shaft torquemeter for use in measuring torque transmission through a rotatable shaft, said torquemeter having an annular torque-sensing coil structure including an annular excitation coil arranged to be disposed coaxially of the shaft and a pickup coil associated with the excitation coil to be magnetically coupled to the excitation coil to provide an output signal varying as a function of variation in the magnetic coupling therebetween, the improvement comprising:
 a tube coaxially fixed at its opposite ends to the shaft and defining a reduced thickness magnetostrictive coupling portion;
 means associated with said coupling portion for preventing a continuous annular conductive path through said coupling portion of the tube;
 means for mounting said coil structure coaxially about said coupling portion for coupling said excitation and pickup coil through said coupling portion; and
 means associated with said tube for preventing shaft bending and thrust loads from affecting the magnetostrictive condition of said coupling portion.

27. The noncontact shaft torquemeter of claim 26 wherein said coupling portion of the tube comprises a magnetostrictive material bonded to a nonmagnetic carrier portion of the tube.

28. A noncontact shaft torquemeter for use in measuring torque transmission through a rotatable shaft, comprising:
 an annular torque-sensing coil structure including an annular excitation coil arranged to be disposed coaxially of the shaft and a pickup coil wound about the excitation coil to be magnetically coupled to the excitation coil to provide an output signal varying as a function of variation in the magnetic coupling therebetween;
 a circumferentially continuous annular, nonmagnetic support mounted coaxially to the shaft;
 a circumferentially discontinuous thin annular body of magnetostrictive material coaxially on said support; and
 means for mounting said coil structure coaxially about said circumferentially discontinuous body at a preselected portion thereof the axial extent of which is substantially greater than the axial extent of said coil structure for preventing a continuous annular conductive path between said coils through said body.

29. The noncontact shaft torquemeter of claim 28 wherein said thin body is bonded to the support.

30. The noncontact shaft torquemeter of claim 28 wherein said thin body comprises a layer deposited on the support.

31. The noncontact shaft torquemeter of claim 28 wherein said thin body has an axial extent substantially less than that of said support.

32. The noncontact shaft torquemeter of claim 28 wherein said thin body has an axial extent substantially less than that of said support and is centered between the ends of the support.

* * * * *